United States Patent [19]

Fujiwara et al.

[11] Patent Number: 4,935,915
[45] Date of Patent: Jun. 19, 1990

[54] BEAM CONTROLLER FOR MAGNETO-OPTICAL DISC MEMORY SYSTEM

[75] Inventors: Tetsuo Fujiwara; Hiroshi Fuji; Takashi Iwaki, all of Tenri; Toshihisa Deguchi; Shozou Kobayashi, both of Nara, all of Japan

[73] Assignee: Sharp Kabushiki Kaisha, Osaka, Japan

[21] Appl. No.: 324,458

[22] Filed: Mar. 16, 1989

Related U.S. Application Data

[62] Division of Ser. No. 919,672, Oct. 16, 1986, Pat. No. 4,843,604.

[30] Foreign Application Priority Data

Oct. 16, 1985 [JP] Japan ................................ 60-230544
Nov. 30, 1985 [JP] Japan ................................ 60-270476

[51] Int. Cl.$^5$ ............................................. G11B 7/125
[52] U.S. Cl. .................................... 369/116; 369/121; 369/122
[58] Field of Search ................. 369/13, 116, 121, 124, 369/122, 128, 100, 54, 106; 365/122; 360/59, 114; 250/205; 307/353; 328/151; 372/29, 31

[56] References Cited

U.S. PATENT DOCUMENTS

4,509,156  4/1985  Ohara et al. .................... 369/116

FOREIGN PATENT DOCUMENTS

59-119547  7/1984  Japan ...................... 369/116
61-117735  6/1986  Japan ...................... 369/116

*Primary Examiner*—Steven L. Stephan
*Assistant Examiner*—Hoa Nguyen

[57] ABSTRACT

A beam controller for controlling a semiconductor laser provided in an optical recording/playback apparatus includes first and second current sources for driving the semiconductor laser at a low level (play-back mode) and/or at a high level (recording or erasing mode). The first and second current sources are controlled to have stable power automatically by a first and second autopower circuits, respectively. The first and second autopower control circuits include a sample-hold circuit which stores an output signal from a low-pass filter. This enables the beam controller to avoid the transition response problems of the low-pass filter. A switching circuit is also included to select either the stored low-pass filter signal on the present low-pass filter signal.

1 Claim, 5 Drawing Sheets

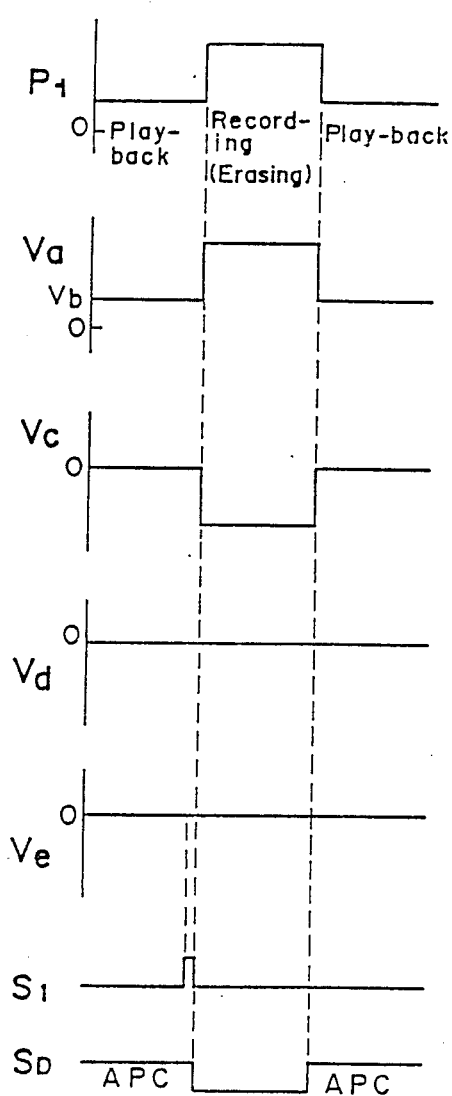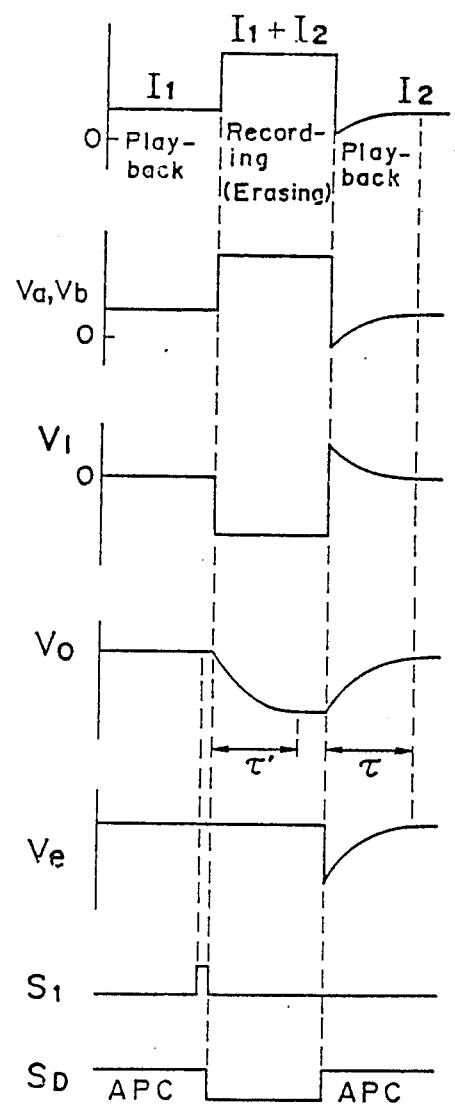

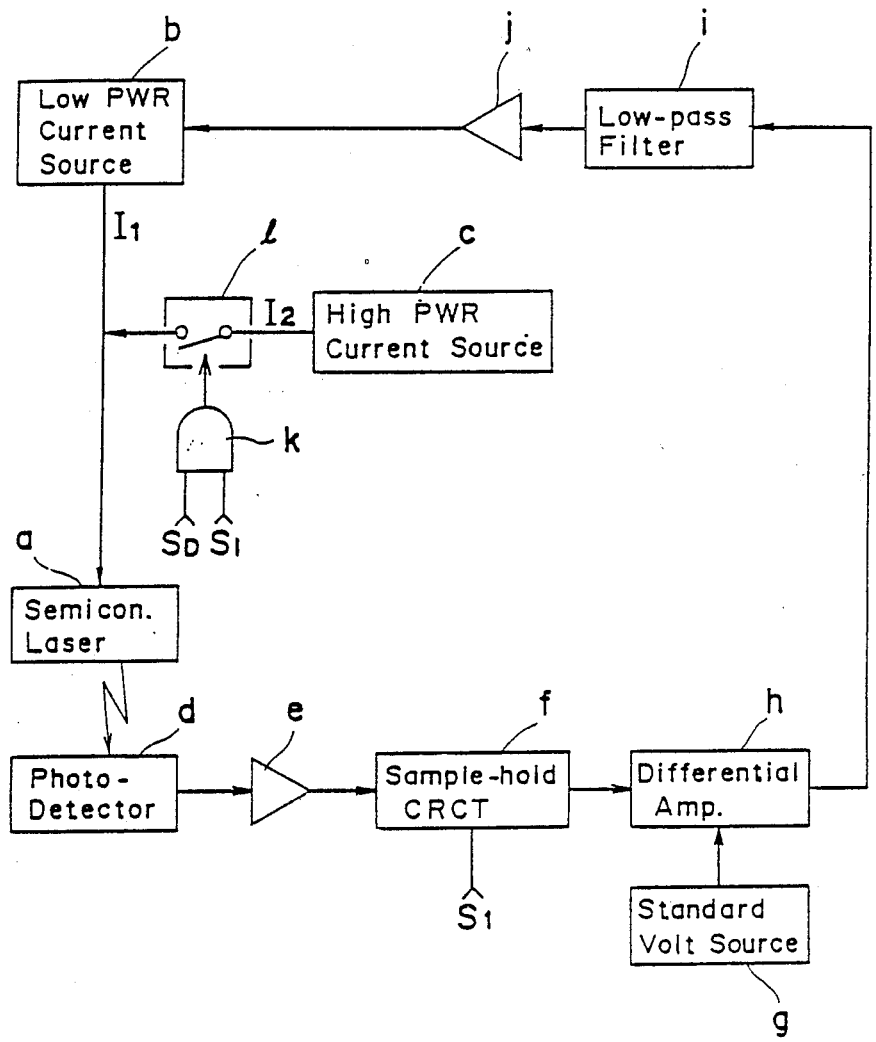

BEAM CONTROLLER FOR MAGNETO-OPTICAL DISC MEMORY SYSTEM

This application is a divisional of copending application Ser. No. 919,672, filed on Oct. 16, 1986, now U.S. Pat. No. 4,843,604.

BACKGROUND OF THE INVENTION

1. Field of the Invention

The present invention relates to a beam control device for controlling a laser beam of a semiconductor laser being provided in an optical memory system in which data can be recorded, playbacked and/or erased by applying the laser beam to a magneto-optical disc.

2. Description of the Prior Art

As is well known to those skilled in the art, the magneto-optical disc has a structure such that an amorphous film of rare metal-ferroalloy is deposited on a substrate such as a glass substrate, by spattering and is covered with a magnetic film having an axis of easy magnetization perpendicular to the surface of the magnetic film.

The optical memory system has a recording head for recording data onto the disc, playback or erasing recorded data in which a semiconductor laser is provided for applying the laser beam to the disc.

In this optical memory system, the recording of data is made according to a method as follows. A laser beam focused to a spot of a diameter of about 1 μm is applied to the magnetic film of the disc to raise the temperature of the portion of the disk to which the laser beam is applied, in order to reduce a coercive force at that portion. At the same time, the direction of magnetization is inverted by applying an auxilliary magnetic field externally to the portion having the temperature raised. The erasing method is essentially same to the recording method just mentioned.

The playback method for data recorded is as follows. A linearly polarized light of the laser beam having an intensity weaker than that of the recording light is applied to the magnetic film of the disc on which data has been recorded, the light having been reflected therefrom has a proper inclination of polarization due to the magneto-optical effect of the magnetic film (Kerr effect). The inclination of polarization is converted to the intensity of light by an analyzer. Play-back signals then can be obtained as outputs from a photo-detector which detects the converted intensity of light.

As is apparent from the description mentioned above, the semiconductor laser should be driven at both a high and low level for recording and playbacking, respectively.

Meanwhile, the semiconductor laser has such a temperature dependence that the intensity of laser beam is varied according to the ambient temperature due to which the threshold current thereof is varied. However, if the intensity of laser beam is varied during the recording at a high level, informations are written into the disc wrongly. This lowers the credibility of the optical memory system. This is also similar to the case of play-back of recorded data. Namely, when the intensity of laser beam is varied during the play-back, S/N ratio of play-back signal to noises is lowered to give wrong information.

In order to solve these problems mentioned above, there has been proposed a laser beam controller for the optical memory system as shown in FIG. 5.

According to this laser beam controller, there are provided first and second current sources (b) and (c) for supplying two different driving currents to a semiconductor laser (a) respectively. The first current source (b) is provided for supplying a low power driving current $I_1$ during the play-back of recorded data. Meanwhile, during the recording of data, the second current source (c) supplies a high power driving current $I_2$ to the semiconductor laser together with the first current source (b) in order to obtain a laser beam of a high intensity.

When the laser is driven only by the first current source (b), the intensity of laser beam emitted is detected by a photodetector (d) and an output signal is inputted, via a pre-amplifier (e), into a sample-hold circuit (f). This sample-hold circuit (f) is controlled by a sample-hold signal $S_1$ in a manner such that, when the sample-hold signal $S_1$ has a high level, data being entered is held and not held when it has a low level. The data signal outputted from the sample hold circuit (f) is compared with a reference voltage given by a standard voltage source (g) at a differential amplifier (h).

The output of differential amplifier (h) is inputted into a low-pass filter (i) and low frequency components are inputted into a power amplifier (j). The power amplifier (j) controls the low current $I_1$ of the low power current source (b).

If the sample-hold signal $S_1$ is set at the low level, according to the power control system mentioned above, the beam intensity of the semiconductor laser (a) is kept constant irrespective to the temperature. This control system is referred to APC (Auto-Power Control) below.

During the high power driving mode (recording mode), the sample hold signal $S_1$ is switched to a high level. Due to this switch, the sample hold circuit (f) holds the data signal, and therefore, APC is frozen.

Further, when the high power driving mode is chosen, a data-record signal $S_D$ of a high level is applied to an AND gate (k) together with the high level sample-hold signal $S_1$ which is provided for controlling a switching circuit (1). This switching circuit (1) is turned on when the output of AND gate (k) becomes a high level, and therefore, the current $I_2$ supplied by the high power current source (c) is added to the current $I_1$ in order to drive the semiconductor laser (a) at the high power level. The reason for freezing the APC is to avoid a possible drop of the beam intensity during the recording and/or erasing mode.

However, the APC apparently operates even in the high power driving mode. This is on the premises that only the threshold value is varied according to the ambient temperature when considering the driving current to the beam intensity curvature characteristic of the semiconductor laser. The gradient of the curvature above the threshold value is not varied according to the ambient temperature. Namely, if the low power driving current $I_1$ is controlled so as to have a higher value than the threshold value, APC can be realized even in the high power driving mode by superposing a constant current on the low power driving current. But these premises are not correct since the gradient of the curve above the threshold is varied according to the ambient temperature and use-time.

The sample-hold circuit (f) employed in the conventional APC shown in FIG. 6 is comprised of a low-pass filter (m) into which the output from a differential pre-amplifier (h) is inputted, memory means (n) which can store the output $V_0$ of the low-pass filter (m) and selecting means (o) for switching either the application of the output of the low pass filter (m) or the memory circuit (n) to a low power driving current source (b). When the play-back mode is indicated, the switching means (o) is switched so as to connect the low-pass filter (m) to the low power driving current source (b) directly. The differential amplifier (h) outputs a signal $V_1$ proportional to the difference between the output signal Va from the photo-detector (d) and a predetermined reference voltage Vb. Therefore, APC is obtained as mentioned above.

When the recording mode (high power driving mode) selected, the switching circuit (o) is switched by the data recording signal $S_D$ so as to connect the memory circuit (n) to the low power driving current source (b). Accordingly, the sample hold circuit (f) outputs a voltage signal $V_m$ having been stored in the memory circuit (n) due to the sample-hold signal $S_1$. As is clearly understood, the sample-hold circuit (f) has a first mode in which the output $V_0$ is outputted via the low pass filter (m) and a second mode during which the output $V_m$ stored in the memory circuit (n) is outputted.

However, this conventional sample-hold circuit (f) has an essential disadvantage in that it is difficult to obtain a quick response upon switching from the recording mode to the play-back mode or vice versa since the low pass filter (m) has a slow transition response.

As shown in FIG. 7, the low pass filter (m) has a relatively slow transition response. When the mode is switched from the recording mode to the play-back mode, the transition of the output voltage Vo of the low pass filter (m) is delayed. Due to this delay in the transition response, the low power driving current $I_1$ supplied by the first current source (b) is also delayed, and therefore, the stabilization of the low power driving current $I_1$ is delayed.

SUMMARY OF THE INVENTION

One of the objects of the present invention is to provide a beam controller for an optical memory system in which APC can be utilized not only in the low power driving mode (play-back mode), but also in the high power driving mode (recording mode).

Another object of the present invention is to provide a beam controller having a sample-hold circuit which can operate with a quick response upon switching from the recording mode to the play-back mode or vice versa.

To this end, according to one embodiment of the present invention, there is provided a beam controller for controlling semiconductor laser provided in an optical recording/playback apparatus which comprises;

first current source for driving the semiconductor laser at a low level necessary for play-backing data stored on optical memory means, second current source for driving the semiconductor laser at a level necessary for recording on and/or erasing data from the optical memory means, first sample-hold circuit for holding data corresponding to a beam intensity from the semiconductor laser being detected upon reproducing the stored data, first control means for controlling the output of the first current source according to the output from the first sample-hold circuit upon recording and/or erasing data in the optical memory means, second sample-hold circuit for holding data corresponding to a beam intensity from the semiconductor laser being detected upon erasing the stored data, second control means for controlling the output current of second current source according to the output from the second sample-hold circuit upon recording data on the optical memory means.

Further, according to another embodiment of the present invention, there is provided a beam controller for controlling a semiconductor laser provided in an optical recording play-back apparatus which comprises;

first current source for driving the semiconductor laser at a level necessary for reproducing data stored on optical memory means, second current source for driving the semiconductor laser at a level necessary for recording data on the optical memory means and/or erasing the stored data, a sample-hold circuit being comprised of switching means having first and second input terminals and one output terminal, low-pass filter means connected to the output terminal of the switching means and memory means for storing the output signal from the low-pass filter means wherein said first input terminal of the switching means is connected so as to input the data corresponding to the beam intensity from the semiconductor laser, second input terminal of the switching means is connected to the output of the memory means and the switching means is controlled so as to connect the first input terminal to the low-pass filter when the play-back mode is selected, and when the recording or erasing mode is selected, to connect the second input terminal to the low-pass filter, and control means for controlling the first current source according to the output signal from the sample-hold circuit.

BRIEF DESCRIPTION OF THE DRAWINGS

These and other objects and features of the present invention will become more apparent from the description of the preferred embodiments accompanying the drawings attached hereto in which:

FIG. 2 is a time chart of the beam controller shown in FIG. 1;

FIG. 5 is a block diagram showing one conventional beam controller;

FIG. 7 is a time chart of the conventional beam controller shown in FIG. 6.

DETAILED DESCRIPTION OF THE PREFERRED EMBODIMENT

First Preferred Embodiment

Figure 1:
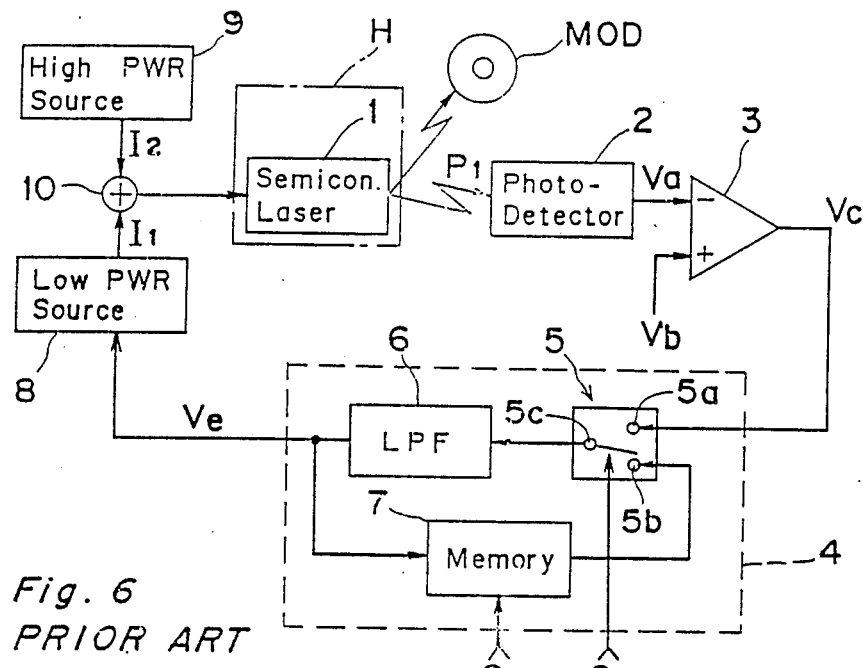
FIG. 1 is a block diagram showing a beam controller according to the first preferred embodiment of the present invention.
Figure 6:
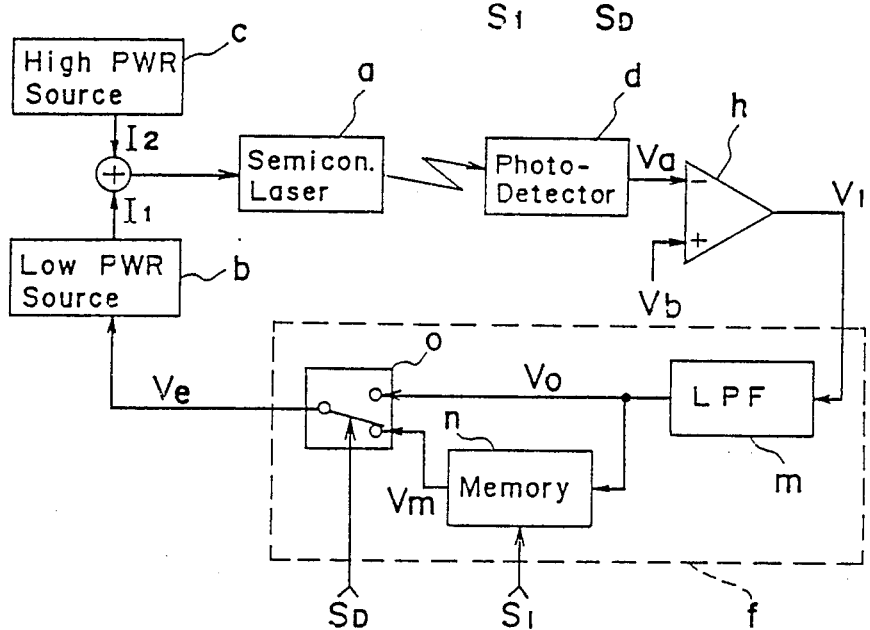
FIG. 6 is a block diagram showing another conventional beam controller.

FIG. 1 shows a block diagram of a beam controller according to the present invention.

As is well known to those skilled in the art, a semiconductor laser device 1 is provided as a light source in a recording head H for recording data onto a magneto-optical disc MOD and/or erasing or playing back data stored thereon.

The beam controller for controlling the intensity of laser beam emitted from the semiconductor laser device 1 is comprised of a photodetector 2 which transforms the laser beam intensity $P_1$ into a voltage signal Va proportional thereto. A differential amplifier 3 which compares the voltage signal Va with a predetermined reference voltage Vb and outputs a difference signal Vc proportional to a difference between two voltage Va and Vb (Vc αVb−Va). A sample-hold circuit 4 generates a control signal Ve in order to control a low power driving current source 8. An adder 10 adds a high power driving current $I_2$ supplied by a high power driving current source 9 to a low level driving current $I_1$ supplied by the low level driving current source 8.

The sample-hold circuit 4 is comprised of a switching means 5, a low-pass filter 6 and a memory circuit 7. The switching means 5 has a first input terminal 5a connected to the output of the differential amplifier 3, a second input terminal 5b connected to the output of the memory circuit 7 and one output 5c connected to the input of the low-pass filter 6. The output cf the low-pass filter 6 is connected to the first driving current source 8, and the input of the memory circuit 7 is connected to the output of the low-pass filter 6.

The memory circuit 7 is operated to store the output signal of the low-pass filter 6 when a sample-hold signal $S_1$ is applied thereto by a control circuit of the optical memory system (not shown). Also, the switching means 5 is switched from the first input terminal 5a to the second input terminal 5b when a recording signal $S_D$ is applied thereto by the control circuit which is continued during the recording mode and erasing mode of the system.

Accordingly, the sample-hold circuit 4 operates so as to connect the differential amplifier 3 to the low-pass filter 6 directly during the play-back mode and to connect the memory circuit 7 to the low-pass filter 6 during the recording or erasing mode in order to apply the stored output signal of the memory circuit 7 to the first driving current source 8.

The second driving current source 9 is turned on by the recording signal $S_D$ during the recording mode and erasing mode and the adder 10 supplies the high level driving current $(I_1+I_2)$ to the semiconductor laser 1 during the recording mode or the erasing mode.

FIG. 2 shows a timing chart of the beam controller.

As shown in FIG. 2, the beam intensity $P_1$ is stablized at a predetermined low level during the play back mode by APC constituted from the photo detector 2, the differential amplifier 3 and the sample-hold circuit 4 as mentioned above. The beam intensity $P_1$ is transformed into voltage signal Va and the differential amplifier 3 outputs the voltage signal Vc which is proportional to the difference between the signal Va and the reference signal Vb.

The sample-hold circuit 4 according to the present invention does not show any problems with transition response as explained below.

At first, during the play back mode, APC is done by the sample-hold circuit 4 since the differential amplifier 3 is directly connected to the low-pass filter 6 during this mode.

Next, just before the recording (erasing) mode is started, the memory circuit 7 stores the filtered voltage signal Ve obtained during the play-back mode when the sample-hold signal $S_1$ is applied to the memory circuit 7.

The switching means 5 is switched from the first input terminal 5a to the second input terminal 5b when the recording signal $S_D$ is changed from the high level to the low level. Therefore, when the recording mode is selected, voltage signal data stored in the memory circuit 7 is inputted into the low-pass filter 6 through the second input terminal 5b. Accordingly, the output signal Ve of the low-pass filter 6 is kept unchanged since the stored signal data Ve is inputted thereto. Due to this, the output signal Ve does not show any transition response.

As the result of this, the low power driving current $I_1$ of the first current source 8 is kept constant without any affection by the transition response of the low pass filter 6.

Accordingly, a stable high level driving current $(I_1+I_2)$ can be obtained as soon as the mode is switched from the play-back mode to the recording (or erasing) mode. Even if the mode is switched from the recording (or erasing) mode to the play-back mode, the output signal Ve of the low-pass filter 6 is kept unchanged since the voltage signal Vc cf the differential amplifier 3 is raised to a level substantialy equal to that in the preceding play-back mode as soon as the mode is switched from the recording mode to the play-back mode.

Second Preferred Embodiment

In this embodiment, one more APC is introduced in order for the high power driving mode namely the recording or erasing mode.

Figure 3:
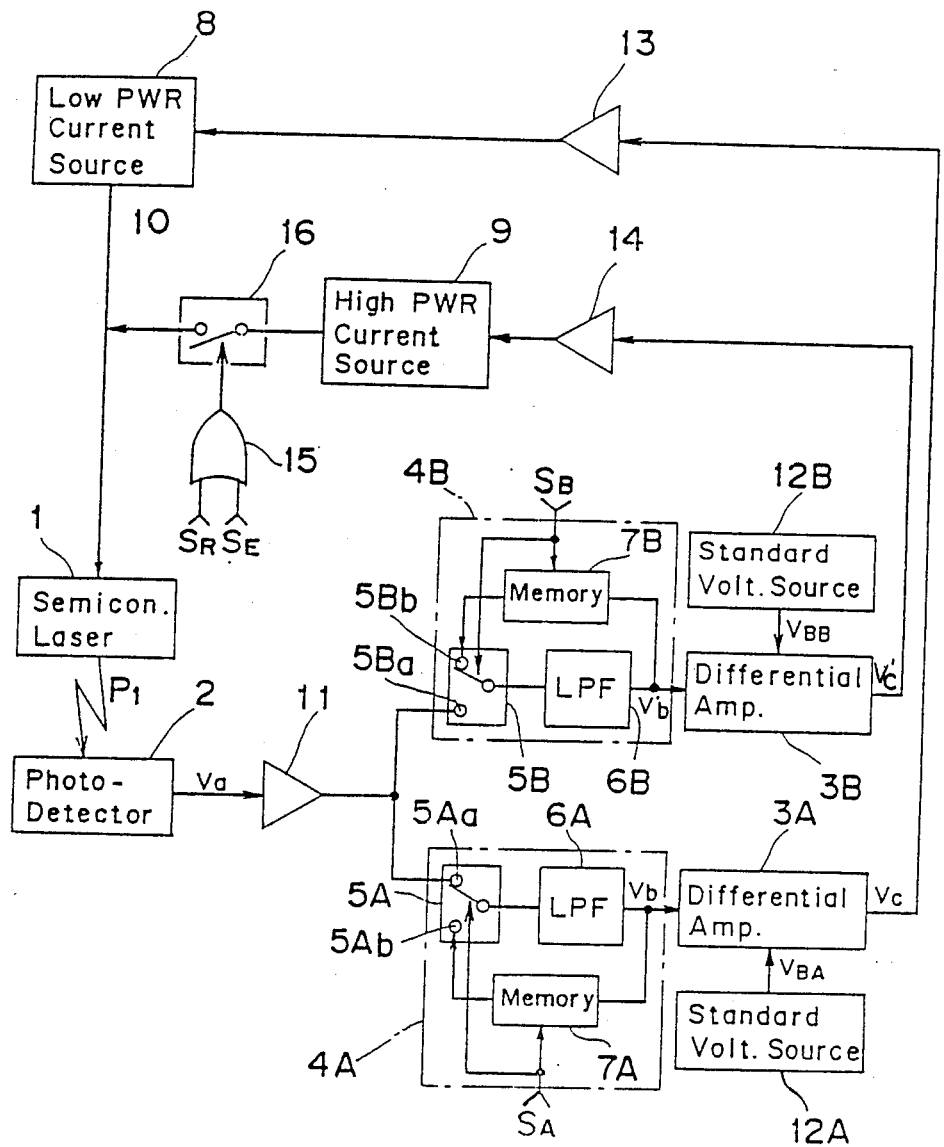
FIG. 3, is a block diagram showing a beam controller according to the second preferred embodiment of the present invention.

As shown in FIG. 3, the output signal Va of the photodetector 2 which detects the beam intensity $P_1$ of the semiconductor laser 1 is inputted via a pre-amplifier 11 into a first sample-hold circuit 4A provided for APC during the low power driving mode and into a second sample-hold circuit 4B provided for APC during the high power driving mode.

Figure 4:
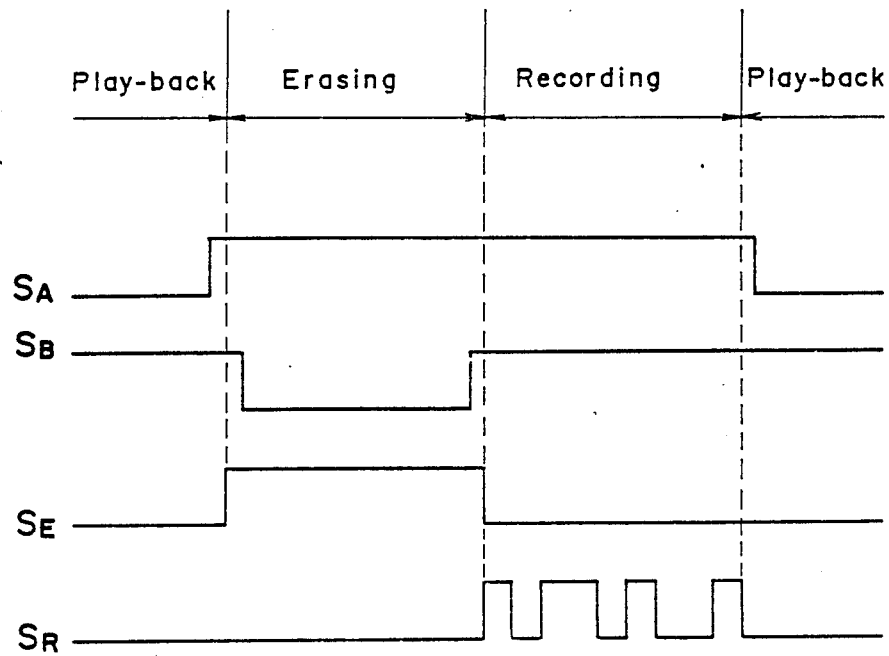
FIG. 4 is a time chart of the beam controller shown in FIG. 3.

The first sample-hold circuit 4A is controlled by a first control signal $S_A$. As shown in FIG. 4, the first control signal $S_A$ is switched from a "Low" level to a "High" level just before the mode is switched from the play-back mode to the erasing mode, and is kept at "High" level during the erasing and recording modes. The level is also switched from "High" level to "Low" level just after the timing when the mode is switched from the recording mode to the play-back mode.

The memory circuit 7A stores the output of the low-pass filter 6A at the rise of the first control signal $S_A$, and at the same time, the switching means 5A is switched from the first input terminal 5Aa to the second input terminal 5Ab. Namely, the first sample-hold circuit 4A freezes APC for the low power driving mode.

On the contrary to the above, the second sample-hold circuit 4B is controlled by a second control signal $S_B$. As shown in FIG. 4, the second control signal $S_B$ is switched from "High" level to "Low" level just after the mode is switched from the play-back mode to the erasing mode, and is switched from "Low" level to "High" level just before the mode is switched from the erasing mode to the recording mode.

The memory circuit 7B of the second sample hold circuit 4B is set to hold the stored data when the second control signal $S_B$ is kept at "High" level. The switching means 5B is switched from the second input terminal 5Bb to the first input terminal 5Ba at the fall of the second control signal $S_B$.

In the play-back mode, namely the low power driving mode, APC for the low power driving current source 8 is carried out as follows.

The photo-detector 2 detects the intensity $P_1$ of the laser beam emitted from the semiconductor laser 1 and the output voltage signal Va is inputted via the pre-amplifier 11 into the first sample-hold circuit 4A. The first control signal $S_A$ is kept at a "High" level during this mode, and therefore, the output signal Va of the photodetector 2 is directly inputted to the low pass filter 6A. Then, the output signal Vb of the low pass filter 6A is inputted into the first comparator 3A. The comparator 3A compares the input signal data Vb with a low level reference voltage $V_{BA}$ which is set by a first standard voltage source 12A and outputs a voltage signal Vc proportional to the difference between Vb and $V_{BA}$ (VC $\alpha V_{BA}-$Vb) This output signal Vc is inputted into a power amplifier 13 provided for controlling the low power driving current source 8.

Thus, APC for the play-back mode is carried out by applying a stablized low power driving current $I_1$ to the semiconductor laser 1.

During this mode, neither an erasing signal $S_E$ nor a recording signal $S_R$ is inputted to an OR gate 15. Accordingly, switch means 16 provided as an adder 10 is kept in OFF state.

On the contrary to the above, APC for the high power driving mode is carried out as follows.

At first, as shown in FIG. 4, the first control sign $S_A$ is dropped to a "Low" level just before the start of the erasing mode to freeze APC for the play-back mode.

Then, the erasing signal $S_E$ is raised to a "High" level to turn on the switch 16. Therefore, the second driving current $I_2$ supplied by the high power driving current source 9 is superposed onto the low driving current $I_1$. The semiconductor laser 1 is then driven by a high power driving current ($I_1+I_2$) necessary for erasing data. Just after the mode is switched to the erasing mode, the second control signal $S_B$ is dropped to a "Low" level as shown in FIG. 4. Due to this, the switching means of the second sample-hold circuit 4B is switched from the second input terminal 5Bb to the first input terminal 5Ba to pass the signal outputted from the pre-amplifier 11 and to input the filtered signal directly to the second differential amplifier 3B.

The second differential amplifier 3B compares the output signal Vb' from the low-pass filter 6B with a second reference voltage $V_{BB}$ of a high level predetermined by a second standard voltage source 12B and outputs a voltage signal Vc' proportional to the difference between two voltages (Vc'$\alpha V_{BB}-$Vc') to a second power amplifier provided for the high power driving current source 9. Thus, APC for the high power driving mode is obtained.

Just before the mode is switched from the erasing mode to the recording mode, the second control signal $S_B$ is switched to "High" level. Due to this, the memory circuit 7B stores the output Vb' of the low-pass filter 6B and is connected to the input of the low-pass filter 6B. Namely, APC for the high driving mode is frozen and the output signal of the second sample-hold circuit 4B is fixed to a value obtained during APC of the erasing mode.

Then, the erasing signal $S_E$ is dropped to a "Low" level to start the recording mode. During the recording mode, data is recorded according to the recording signal $S_R$.

It is to be noted that APC is not done during the recording mode but it is done just before the recording mode, in other words during the erasing mode in which the semiconductor laser is driven by a high power driving current. This ensures stable beam control during the recording mode.

Although the present invention has been fully described by way of example with reference to the accompanying drawings, it is to be noted here that various changes and modifications will be apparent to those skilled in the art are possible without departing from the scope of the present invention, they should be construed as being included therein.

What is claimed is:

1. A beam controller for controlling a semiconductor laser provided in an optical recording and reproducing apparatus comprising:

first current source means for generating a first current to drive the semiconductor laser at a low level necessary for reproducing data stored on an optical memory device;

second current source means for generating a second current to be used in driving the semiconductor laser at a high level necessary for recording data onto said optical memory device and/or erasing data stored on said optical memory device;

a sample-hold circuit including, switching circuit having first and second input terminals and one output terminal, a low-pass filter connected to said output terminal of said switching circuit, and memory means for storing an output signal from said low-pass filter;

said first input terminal of said switching circuit being connected so as to input data corresponding to an intensity of the beam from the semiconductor laser;

said second input terminal of said switching circuit being connected to an output of said memory means;

said switching circuit being controlled so as to connect said first input terminal to said low-pass filter when a reproducing mode is selected;

said switching circuit connecting said second input to said low-pass filter when a recording or erasing mode is selected; and control means, in response to said sample-hold circuit, for controlling said first current source to generate said first current.

* * * * *